United States Patent [19]

Zaccaira

[11] 3,940,876
[45] Mar. 2, 1976

[54] MOUSETRAP

[76] Inventor: Michael Frank Zaccaira, 123 Cushman Ave., Revere, Mass. 02151

[22] Filed: Nov. 1, 1974

[21] Appl. No.: 520,130

[52] U.S. Cl. ............................... 43/131; 43/66
[51] Int. Cl.² .................................. A01M 25/00
[58] Field of Search ............... 43/66, 65, 131, 61

[56] References Cited
UNITED STATES PATENTS

| | | | |
|---|---|---|---|
| 741,935 | 10/1903 | Schickerling | 43/66 |
| 1,488,503 | 4/1924 | Karda | 43/66 |
| 1,618,513 | 2/1927 | Coghill | 43/66 |
| 1,769,408 | 7/1930 | Andrews | 43/131 |
| 2,953,868 | 9/1960 | Chambers | 43/131 |

*Primary Examiner*—Warner H. Camp
*Attorney, Agent, or Firm*—Joseph S. Iandiorio

[57] ABSTRACT

A safe animal trap including a bait chamber for carrying bait to attract the animal to be trapped; a hole in the bait chamber sized to admit the animal to be trapped; an access member having an elongated passage for communicating with the hole, the passage proportioned to restrict entry into the chamber, the passage being sufficiently wide to permit movement therethrough of the animal and being at least as long as it is wide; and means for engaging the access member with the bait chamber.

2 Claims, 4 Drawing Figures

MOUSETRAP

FIELD OF INVENTION

This invention relates to an animal trap in which access to the bait chamber is restricted.

BACKGROUND OF INVENTION

Conventional animal traps, such as mousetraps generally are one of two types: spring loaded or poison bait. The former is dangerous not only to the fingers of the setter of the trap but also presents a serious hazard to household pets and children who might as a result of curiosity or inattention accidentally trip the trap. The latter is more dangerous because the bait in these traps often contains poison and is not meant merely to trap but to kill the animal and could result in the poisoning of a household pet or child. The poison bait type of trap has a bait chamber accessible through a port of some type often with a one-way door to enable entry but prevent escape of the animal after it has taken the bait. There is a great variety of such traps some of which are quite complex. Yet, generally, in each case access to the bait chamber is through a small port or hole. Even though the hole is generally small and even though there may be a one-way door, a cat's paw, or the nimble little fingers of a small child are small enough to pass through the hole and reach the bait. There is also the additional danger that the trap will be upset causing the bait which often contains poison to spill out of the trap where it can be reached by children and pets.

SUMMARY OF INVENTION

It is therefore an object of this invention to provide an improved, simple, inexpensive and easy-to-use, safe animal trap which reduces the hazard to household pets and children caused by the presence of poisoned bait.

It is a further object of this invention to provide such an improved trap which structurally restricts access to the bait chamber.

It is a further object of this invention to provide such an improved trap which reduces the danger that the trap will be upset and the bait spilled out of it.

The invention results from the realization that a safe animal trap could be made by providing a long and narrow passage to the bait chamber such that the extended length of the passage coupled with its narrowness make it extremely difficult for a child to get its hand, or a cat its paw, all the way through the passage into the bait chamber.

The invention features a safe animal trap such as a mousetrap having a bait chamber for carrying bait to attract the animal to be trapped. There is a hole in the bait chamber sized to admit the animal to be trapped. An access member has an elongate passage through it for communicating with the hole. The passage is proportioned to restrict entry to the chamber; the passage is sufficiently wide to permit movement therethrough of the animal to be trapped and is at least as long as it is wide. There are means provided for engaging the access member with the bait chamber.

In specific embodiments the access member and bait chamber may be releasably interconnected. A one-way door may be provided for permitting the mouse to enter the bait chamber and take the bait but prevent its escape thereafter. This is especially useful if the bait is a slow acting poison which will not act quickly enough to prevent the mouse from leaving the bait chamber. Securing means may be provided for releasably securing either the member or the chamber or both in a fixed position to prevent the trap from being upset and the bait from spilling out where it would be available to pets and children.

DISCLOSURE OF PREFERRED EMBODIMENT

Other objects, features and advantages will occur from the following description of a preferred embodiment and the accompanying drawings, in which.

The invention may be accomplished using a bait chamber for carrying bait to attract the animal to be trapped such as a mouse. A sealed bait chamber may be constructed using a glass or plastic jar in which a portion of bait is placed. There is a hole provided in the bait chamber typically constituted by the mouth of the jar which is large enough to admit the animal to be trapped. An access member which may be a block of wood is provided with an elongated passage through it which communicates with the hole in the bait chamber. The elongated passage is proportioned to restrict entrance to the chamber. The passage is sufficiently wide to permit movement through it of the animal to be trapped and preferably not wider than that. The passage is at least as long as it is wide preferably much longer in order to prevent a cat's paw or child's hand from reaching all the way through the passage to the bait chamber even though the hand or paw might be small enough to fit in the passage. Some means is provided for sealingly engaging the access member with the bait chamber. Typically this might be a cover for the plastic or glass jar; the cover would have a hole in it at least as big as the passage through the access member and would be secured to the access member. The cover could be fixed to the access member and removeable from the jar or chamber so that the bait chamber and access member are releasably interconnected. Alternatively, the cover may be fixed to the chamber and/or the chamber may be fixed to the access member, e.g., the chamber and member could be integrally formed. A one-way door may be provided most conveniently in the cover to permit the mouse to enter the bait chamber but prevent its escape therefrom.

Some securing means such as rubber suction cups or screw fasteners may be attached to either or both the bait chamber and the access member to secure the trap to a neighboring floor or wall to prevent it from being accidentally upended and the poison bait spilled out of it.

Figure 1:
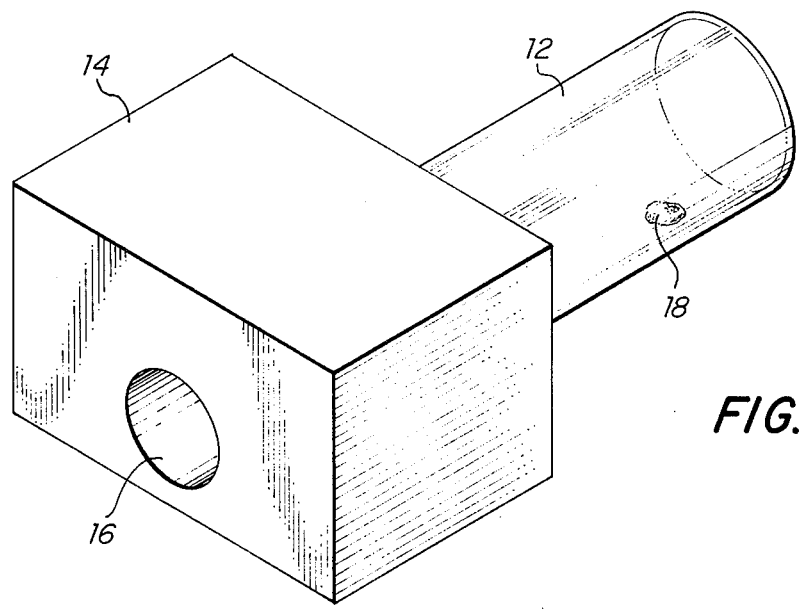
FIG. 1 is an axonometric view of an animal trap according to this invention.
Figure 2:
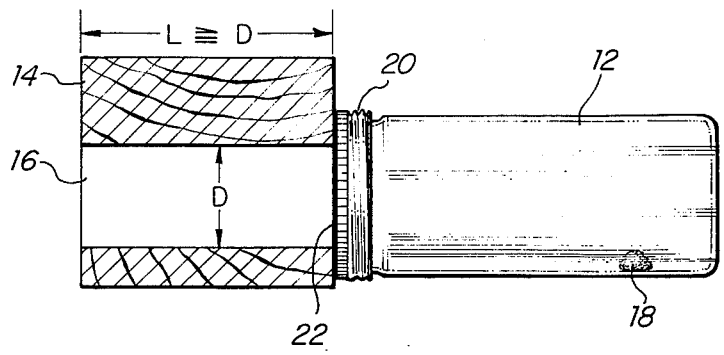
FIG. 2 is a side elevational view of the trap of FIG. 1 with the access member shown in cross section.

There is shown in FIG. 1 a mousetrap 10 according to this invention including a transparent bait chamber 12 and an access member 14. The mouse must enter through passage 16 in access member 14 to reach the bait 18 in bait chamber 12. Passage 16 in access member 14, FIG. 2, is cylindrical in form and has a length L which is equal to or greater than its diameter D. Bait chamber 12 is fastened to access member 14 by means of cover 20 which contains a hole 22 that interconnects passage 16 with the interior of bait chamber 12. Cover 20 may contain threads or other means for releasably, sealingly, engaging bait chamber 12.

Figure 3:
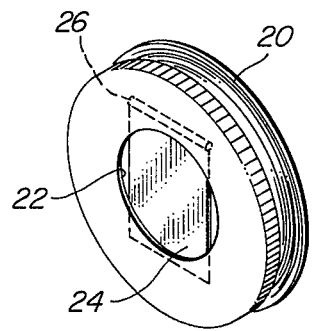
FIG. 3 is an axonometric view of a cover which may be used to sealingly engage the bait chamber in FIG. 1.
Figure 4:
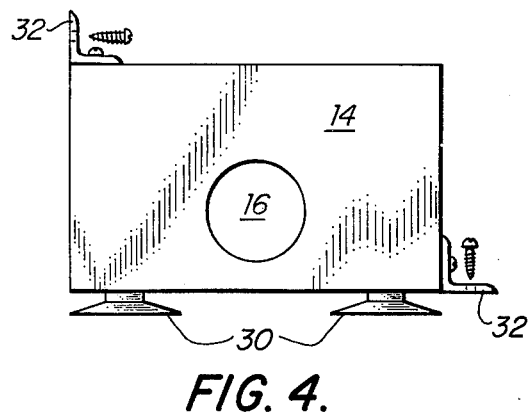
FIG. 4 is a front view of the trap of FIG. 1 showing two different types of devices for securing the trap in a fixed position.

Cover 20, FIG. 3, may include a one-way door 24 on the bait chamber side of hole 22 in order to permit ingress of the mouse but to prevent egress. Although door 24 is shown as a simple one piece flap hinged at 26 to cover 20 it may utilize various other constructions which are well known in the prior art such as spikes, individual pins, and the like.

In order to prevent the trap from being upended and the poison bait 18 spilled out of bait chamber 12 and through passage 16, either chamber 12 or member 14 may be fixed to a wall or floor or other relatively stationary object in the area by means of rubber suction cups 30 or one or more fastening brackets 32.

Other embodiments will occur to those skilled in the art and are within the following claims.

What is claimed is:
1. A safe animal trap comprising a bait chamber for carrying solid poison bait to attract the animal to be trapped; a hole in said bait chamber sized to admit the animal to be trapped; an access block having at least one flat surface for stably stationing said trap, said block having an elongate passage through it, generally parallel to said surface, for communicating with said hole, said passage proportioned to be significantly longer than it is wide to restrict entry to said chamber, said passage being sufficiently wide to permit movement therethrough of the animal; and means for engaging said access block with said bait chamber.

2. The trap of claim 1 further including securing means for releasably securing at least one of said block and chamber in a fixed position.

* * * * *

UNITED STATES PATENT AND TRADEMARK OFFICE
CERTIFICATE OF CORRECTION

PATENT NO. : 3,940,876
DATED : March 2, 1976
INVENTOR(S) : Michael Frank Zaccaira It is certified that error appears in the above-identified patent and that said Letters Patent are hereby corrected as shown below:

The inventor's name should be corrected to read

Michael Frank Zaccaria.

Signed and Sealed this eleventh Day of May 1976

[SEAL]

Attest:

RUTH C. MASON
Attesting Officer

C. MARSHALL DANN
Commissioner of Patents and Trademarks